United States Patent [19]
Friedman et al.

[11] 4,179,190
[45] Dec. 18, 1979

[54] WIDE BAND ADJUSTABLE BREWSTER ANGLE POLARIZER

[75] Inventors: Jerome D. Friedman; Carl A. Pitha, both of Lexington, Mass.

[73] Assignee: The United States of America as represented by the Secretary of the Air Force, Washington, D.C.

[21] Appl. No.: 866,742

[22] Filed: Jan. 3, 1978

[51] Int. Cl.² .............................................. G02B 5/30
[52] U.S. Cl. ................................................... 350/152
[58] Field of Search ......................................... 350/152

[56] References Cited

U.S. PATENT DOCUMENTS

| | | | |
|---|---|---|---|
| 2,651,971 | 9/1953 | Rosch | 350/152 |
| 3,428,388 | 2/1969 | Kuebler et al. | 350/152 |
| 3,439,968 | 4/1969 | Hansen et al. | 350/152 |

FOREIGN PATENT DOCUMENTS

1155625  5/1958  France ...................................... 350/152

OTHER PUBLICATIONS

Klauser, H. E., "Infrared Polarizer", *IBM Technical Disclosure Bulletin*, vol. 6, No. 10, Mar. 1964, p. 51.

*Primary Examiner*—John K. Corbin
*Assistant Examiner*—R. A. Rosenberger
*Attorney, Agent, or Firm*—Joseph E. Rusz; Jacob N. Erlich

[57] ABSTRACT

A wide band adjustable Brewster angle polarizer having a pair of dielectric elements adjustably mounted within a housing. A dial micrometer is operably attached to the means for adjusting the angular relationship between the normal to the dielectric material and an incoming beam of unpolarized light. The micrometer is calibrated in direct relationship between the wavelength of the incoming beam of light and the establishment of a Brewster angle between the normal to the dielectric material and the incoming beam. Thereby, by proper selection of the dielectric material, light ranging from the ultraviolet to the infrared range of the optical spectrum can be quickly and reliably polarized.

8 Claims, 1 Drawing Figure

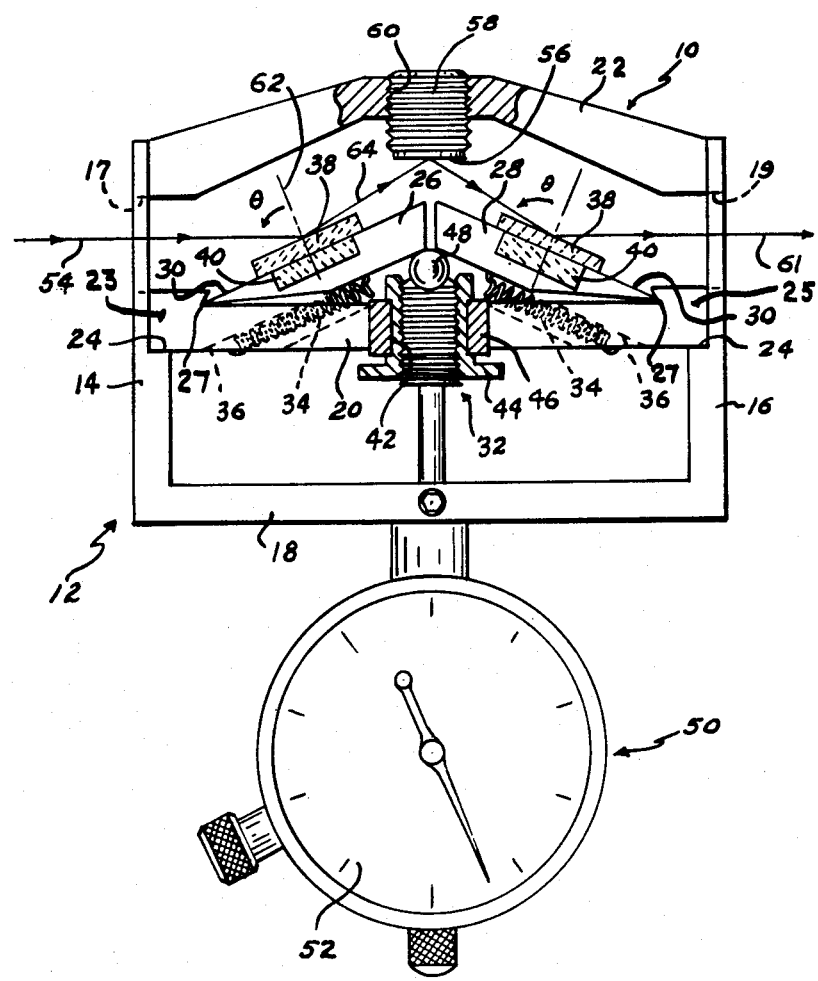

WIDE BAND ADJUSTABLE BREWSTER ANGLE POLARIZER

STATEMENT OF GOVERNMENT INTEREST

The invention described herein may be manufactured and used by or for the Government for governmental purposes without the payment of any royalty thereon.

BACKGROUND OF THE INVENTION

This invention relates generally to polarizers, and, more particularly to polarizers which are adjustable, and, therefore, reliably operable over a wide range of wavelengths, i.e., from the ultra-violet through the infrared portion of the optical spectrum.

Polarized light is one of the most useful mechanisms known for studying the characteristics of materials. In many areas, such as in the testing of laser windows, for example, it is of utmost important to analyze the material to be used prior to its actual use. In so doing, catastrophic results can be avoided and the overall cost of a project greatly reduced.

Polarized light is light which has its electric vector oriented in a predictable fashion with respect to the propagation direction while unpolarized light has the vector oriented in a random, unpredictable fashion. It is also generally acknowledged that it is the electric vector rather than the magnetic vector of a light wave that is responsible for the effects of polarization and other observed phenomena associated with light. Therefore, the electric vector of a light wave, for all practical purposes, is considered the light vector.

One of the simplest ways of producing poloarized light is by reflection from a dielectric surface. At a particular angle of incidence, the reflectivity for light whose electric vector is in the plane of incidence becomes zero. The reflected light is thus linearly polarized at right angles to the plane of incidence. Brewster's law states that at the polarizing angle the refracted ray makes an angle of 90° with the reflected ray. By combining this relationship with Snell's law of refraction, it is found that $\tan i = n$ where $i$ is the angle of incidence and $n$ is the refractive index. This provides a simple way of measuring refractive indices.

Generally polarizers are constructed of dichroic crystals such as Tourmaline or birefringent crystals such as transparent calcite (Icelandic spar). Unfortunately, there are no practical crystals that are capable of polarizing light in the infrared range as well as polarizing light over a wide range of the optical spectrum. Since diamonds (which are capable of polarizing light in the infrared range) are too expensive to use as polarizers and other polarizers heretofore in use generally are too inaccurate, within the infrared range, for the precision required in many of the testing procedures used today, a need has arisen for polarizers which are useable with light in the infrared portion of the optical spectrum.

SUMMARY OF THE INVENTION

The instant invention provides a polarizer which is reliably operable over a wide range of wavelengths, from the ultra-violet to the infrared, and therefore overcomes the problems set forth hereinabove.

When it is desirable to produce a polarized beam of light in the infrared range it is impactical to utilize those crystals which are capable of polarizing light in the ultra-violet range of the optical spectrum. It is in this area where the wide band adjustable polarizer of this invention finds greatest utility, in that it is capable of very quickly and accurately adjusting the angular relationship of an input beam so as to establish a Brewster angle relationship with respect thereto and therefore result in the output of a polarized beam of light, particularly in the infrared range.

The wide band adjustable Brewster angle polarizer of this invention is made up of a housing which incorporates therein a pair of supporting structures. One of the supporting structures has movably mounted thereon a pair of adjustable mounts. These mounts each contain a dielectric material utilized for directing and redirecting an incoming beam in such a manner that the resultant output beam is polarized. The second supporting structure mounts in adjustable fashion a reflective surface which is utilized in conjunction with the dielectric material for realigning the output polarized beam.

The adjustable mounts are spring biased and capable of being moved by a compound feed screw so that the angle between the normal to the dielectric material and the incoming light ray or beam can be adjusted to the Brewster angle. A dial micrometer calibrated in such a fashion to establish the wavelength at which the Brewster angle is reached is attached to the compound screw.

During use an unpolarized (preferably infrared) incoming beam of light strikes the first dielectric material. By proper adjustment of the compound screw the angle between the normal to the dielectric material and the incoming light beam is set at the Brewster angle. The reflected beam of light is directed to the centrally located reflective surface and from there reflected onto the second dielectric material, again at the Brewster angle. Since the beam which is directed onto the second dielectric means is also at the Brewster angle the reflection therefrom results in an output beam which is polarized.

It is therefore an object of this invention to provide an adjustable Brewster angle polarizer which is extremely efficient and reliable in polarizing light in the infrared portion of the optical spectrum.

It is another object of this invention to provide a wide band adjustable Brewster angle polarizer which is easily tunable and repeatable for precise optical wavelengths.

It is still another object of this invention to provide a wide band adjustable Brewster angle polarizer in which a single device is capable of polarization in virtually any portion of the optical spectrum.

It is still a further object of this invention to provide a wide band adjustable Brewster angle polarizer which is economical to produce and which utilizes conventional, currently available components that lend themselves to standard mass producing manufacturing techniques.

For a better understanding of the present invention, together with other and further objects thereof, reference is made to the following description taken in conjunction with the accompanying drawing and its scope will be pointed out in the appended claims.

DETAILED DESCRIPTION OF THE DRAWING

The only FIGURE of the drawing is a side elevational view, shown partly in schematic fashion and partly in cross-section, of the wide band adjustable Brewster angle polarizer of this invention.

DETAILED DESCRIPTION OF THE PREFERRED EMBODIMENT

Reference is now made to the only Figure of the drawing wherein the wide band adjustable Brewster angle polarizer 10 of this invention is clearly illustrated. Polarizer 10 of the instant invention is constructed of a housing 12 preferably of rectangular configuration, although not limited thereto, and made of any suitable material such as a lightweight metal or plastic. Housing 12 generally has a pair of upstanding elements or legs 14 and 16 which are supported perpendicularly to a base 18. Legs 14 and 16 may be of a frame-like construction or solid, in which case they also include input and output openings 17 and 19, respectively. Fixedly secured to legs 14 and 16 are a pair of supporting structures 20 and 22. Supporting structure 22 is secured within the uppermost portion of housing 12 while supporting structure 20 is located intermediate base 18 and supporting structure 22.

Supporting structure 20 has a substantially flat top surface 21 terminating in a pair of upstanding elements 23 and 25 at each end thereof. Elements 23 and 25 join flat surface 21 in an angular relationship so as to accommodate a pair of adjustably movable mounts 26 and 28, respectively, in a manner to be described in detail hereinbelow. Structure 20 is generally fixedly secured between upstanding legs 14 and 16 by having end elements 23 and 25 resting upon a pair of notched shelves 24 formed within each of said legs 14 and 16, respectively, although, any other type of stable mounting arrangement can also be utilized. Movably connected to supporting structure 20 are a pair of spaced apart adjustable mounts 26 and 28. Mounts 26 and 28 are of identical construction, each terminating in V-shaped end portion 30. For clarity, the following detailed description will be given with respect to only one such mount 26 with like elements being given identical numerals in the drawing.

Mount 26 is movably attached to support 20 by the mating engagement between end portion 30 and element 23 at the angular intersection 27 of element 23 and surface 21 in a knife-edge type of relationship. This knife-edge mounting arrangement is critical since extreme accuracy is required by the adjustable feature of this invention. The other end of mount 26 is supported on an adjustable support assembly 32 in a manner to be described in detail hereinbelow. In addition, any suitable biasing means such as a spring 34 is interposed and operatively connected between the bottom of mount 26 and support structure 20. An aperture 36 may be located within supporting structure 20 so as to allow spring 34 to pass therethrough. Any suitable connecting mechanism may be utilized to fixedly secure spring 34 at one end to mount 26 and at the other end to support 20. Spring 34 being of the type capable of biasing mount 26 in a direction toward the adjustable support assembly 32 so that mount 26 is in constant contact with assembly 32. As stated hereinabove the description set forth with respect to mount 26 is also applicable to the adjustable mounting arrangement of mount 28.

Centrally located within mount 26 (and 28) is any suitable optically configurated dielectric material 38 which is capable of transmitting light in both the visible and infrared range of the optical spectrum this material preferably being germanium, zinc selenide or sapphire. Situated in back of and supporting dielectric material 38 is an absorber 40 made of any suitable material such as carbon. For compactness of construction, absorber 40 may be embedded within mount 26.

The adjustable support assembly 32 is centrally located within an aperture 42 within supporting structure 20. This assembly 32 is in the form of any conventional easily adjustable drive means such as a compound feed screw 44. Compound screw 44 is rotatably mounted within a sleeve 46 located in aperture 42 within support 20. A ball bearing 48 is positioned on one end of screw 44 being interposed between mounts 26 and 28 and the compound screw 44. As a result thereof a virtually friction free drive arrangement is established between mounts 26 and 28 and compound screw 44.

Operably attached to the other end of compound screw 44 is any conventional dial micrometer 50 which is calibrated so that the scale 52 thereon is capable of setting forth the wavelength at which the Brewster angle is reached between an incoming beam 54 and the dielectric materials 38 in a manner to be described in detail hereinbelow. This Brewster angle determination can be made either mathematically or by any appropriate detection means which is capable of receiving only polarized light.

Supporting structure 22 incorporates therein a reflective surface such as any conventional mirror 56 centrally disposed within supporting structure 22 and in optical alignment with dielectric materials 38. Mirror 56 is mounted on an adjustable screw-like fitting 58 which is rotatably secured within a central aperture 60 in supporting structure 22. Fitting 58 is capable of up and down movement and thereby can vary the height of mirror 56 in order to relocate or realign the output beam 61 emanating from polarizer 10 of this invention.

In operation a beam of unpolarized light 54, preferably in the infrared range of the optical spectrum, passes through input aperture 17 located within upstanding element 14 of polarizer 10. The incoming light beam 54 strikes the first dielectric material 38 located on mount 26 so that the angle $\theta$ between the normal 62 to the dielectric material 38 and light beam 54 is at the Brewster angle. Thus that portion of light beam 54 polarized in the plane of dielectric material 38 is reflected while the other polarizations of light beam 54 are refracted into carbon absorber 40 and absorbed. The reflected polarized beam 14 is then reflected off mirror 56 and from mirror 56 directed to the dielectric material 38 located on mount 28 also at the Brewster angle $\theta$, whereupon reflection from second dielectric material 38, the polarization is improved again. The outcoming beam 61 is a polarized light ray or beam which passes through output aperture 19 in upstanding leg 16 and onto any target or testing apparatus (not shown) to be used with the polarizer 10 of this invention.

With polarizer 10 of this invention $\theta$ is optimized for a descrete wavelength of light. For any other wavelength of light $\theta$ must change to $\theta \pm \Delta\theta$. This is accomplished by rotating compound feed screw 44 which moves ball bearing 48 which in turn raises mounts 26 and 28 or lowers mount 26 and 28 under the biasing force of springs 34, thus optimizing the Brewster angle, $\theta$, for the new wavelength of light. Since dial micrometer 50 is operably connected to compound screw 44 and therefore moves in direct relationship to the movement of mounts 26 and 28 and angle $\theta$, the precise wavelength at which the Brewster angle $\theta$ is reached can by directly read on dial micrometer 50. Since micrometer 50 has been previously calibrated for various wavelengths of light, light may be polarized at any wavelength by merely adjusting compound screw 44 so that the dial micrometer reads at the particular wavelength of incoming light beam 54. The movement of mounts 26 and 28, however, although polarizing output beam 61 also displaces the alignment of the output beam 61. In order to compensate for this problem, adjustable fitting 58 can move mirror 56 thereby aligning output beam 61 to its preselected destination.

The wide band adjustable Brewster angle polarizer 10 of this invention is an extremely reliable tool for polarizing an incoming beam of light. Since the Brewster angle is a function of the wavelength of the light 54 being used and also a function of the index of refraction of the dielectric material 38 the same polarizer 10 can be used from the ultraviolet through the infrared portion of the optical spectrum merely by changing the Brewster angle and, when the changes are large, the dielectric material used.

Although this invention has been described with reference to a particular embodiment, it will be understood to those skilled in the art that this invention is also capable of further and other embodiments within the spirit and scope of the appended claims.

We claim:

1. A wide band adjustable polarizer comprising a housing, a first and a second mount, each of said mounts being movably connected in the knife-edge type relationship at one end thereof to said housing, a dielectric element being secured to said first mount, another dielectric element being secured to said second mount, each of said dielectric elements being made of a material capable of transmitting light in both the visible and infrared range of the optical spectrum means operably connected to said housing and optically interposed between said pair of dielectric elements for directing a reflected beam of light from one of said dielectric elements to the other of said dielectric elements, and means operably connected to said first and second mounts for equally displacing said first and second mounts a preselected distance whereby upon proper adjustment of said first and second mounts the angle between the normal to said dielectric element and an incoming light beam is established at the Brewster angle thereby producing a reflected beam of light from said dielectric element which is polarized.

2. A wide band adjustable polarizer as defined in claim 1 further comprising means for absorbing light positioned adjacent each of said dielectric elements.

3. A wide band adjustable polarizer as defined in claim 1 wherein said displacing means comprises a spring operatively connected between each of said mounts and said housing and a compound feed screw operatively connected between the other ends of said first and second mounts.

4. A wide band adjustable polarizer as defined in claim 3 wherein said directing means is adjustably mounted within said housing.

5. A wide band adjustable polarizer as defined in claim 3 further comprising means operably connected to said compound feed screw for recording the amount of movement of said feed screw, said recording means being calibrated in direct relationship between the wavelength of said incoming beam of light and said Brewster angle.

6. A wide band adjustable polarizer as defined in claim 5 wherein said directing means is adjustably mounted within said housing.

7. A wide band adjustable polarizer as defined in claim 6 further comprising means for absorbing light positioned adjacent each of said dielectric elements.

8. A wide band adjustable polarizer as defined in claim 7 wherein said recording means is a dial micrometer.